(12) United States Patent
McCusker et al.

(10) Patent No.: US 11,657,819 B2
(45) Date of Patent: May 23, 2023

(54) SELECTIVE USE OF TOOLS FOR AUTOMATICALLY IDENTIFYING, ACCESSING, AND RETRIEVING INFORMATION RESPONSIVE TO VOICE REQUESTS

(71) Applicant: BANK OF AMERICA CORPORATION, Charlotte, NC (US)

(72) Inventors: Ion Gerald McCusker, Allen, TX (US); Ramakrishna R. Yannam, The Colony, TX (US); Ashwini Patil, Richardson, TX (US); Saahithi Chillara, Allen, TX (US); Ravisha Andar, Plano, TX (US); Emad Noorizadeh, Plano, TX (US); Pravin Kumar Sankari Bhagavathiappan, Chennai (IN); Yogesh Raghuvanshi, Princeton, NJ (US); Sushil Golani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 89 days.

(21) Appl. No.: 17/212,141

(22) Filed: Mar. 25, 2021

(65) Prior Publication Data

US 2022/0310086 A1 Sep. 29, 2022

(51) Int. Cl.
*G09B 7/02* (2006.01)
*G10L 15/22* (2006.01)
(Continued)

(52) U.S. Cl.
CPC .............. *G10L 15/22* (2013.01); *G06N 20/00* (2019.01); *G10L 15/10* (2013.01); *G06F 16/24578* (2019.01); *G06F 16/334* (2019.01); *G09B 7/02* (2013.01); *G10L 2015/221* (2013.01); *G10L 2015/225* (2013.01)

(58) Field of Classification Search
CPC .......... G09B 7/02; G09B 7/00; G06F 16/334; G06F 16/24578
See application file for complete search history.

(56) References Cited

U.S. PATENT DOCUMENTS

| 7,042,440 B2 | 5/2006 | Pryor et al. |
| 7,222,078 B2 | 5/2007 | Abelow |

(Continued)

*Primary Examiner* — Feng-Tzer Tzeng

(57) ABSTRACT

An apparatus includes a memory and a processor. The memory stores a machine learning algorithm configured to select between forwarding a request to an agent device and transmitting an automatically generated reply to the request. The processor receives feedback for a decision made by the algorithm, indicating whether the automatically generated reply includes the information sought by the request. If the algorithm decided to forward the request to the agent device, a reward is assigned to feedback that indicates that the reply does not include the information, while a punishment is assigned to feedback that indicates that the reply includes the information. If the algorithm decided to transmit the reply, a reward is assigned to feedback that indicates that the reply includes the information, and a punishment is assigned to feedback that indicates that the reply does not include the information. The processor updates the algorithm using the reward/punishment.

17 Claims, 4 Drawing Sheets

Figure 1:
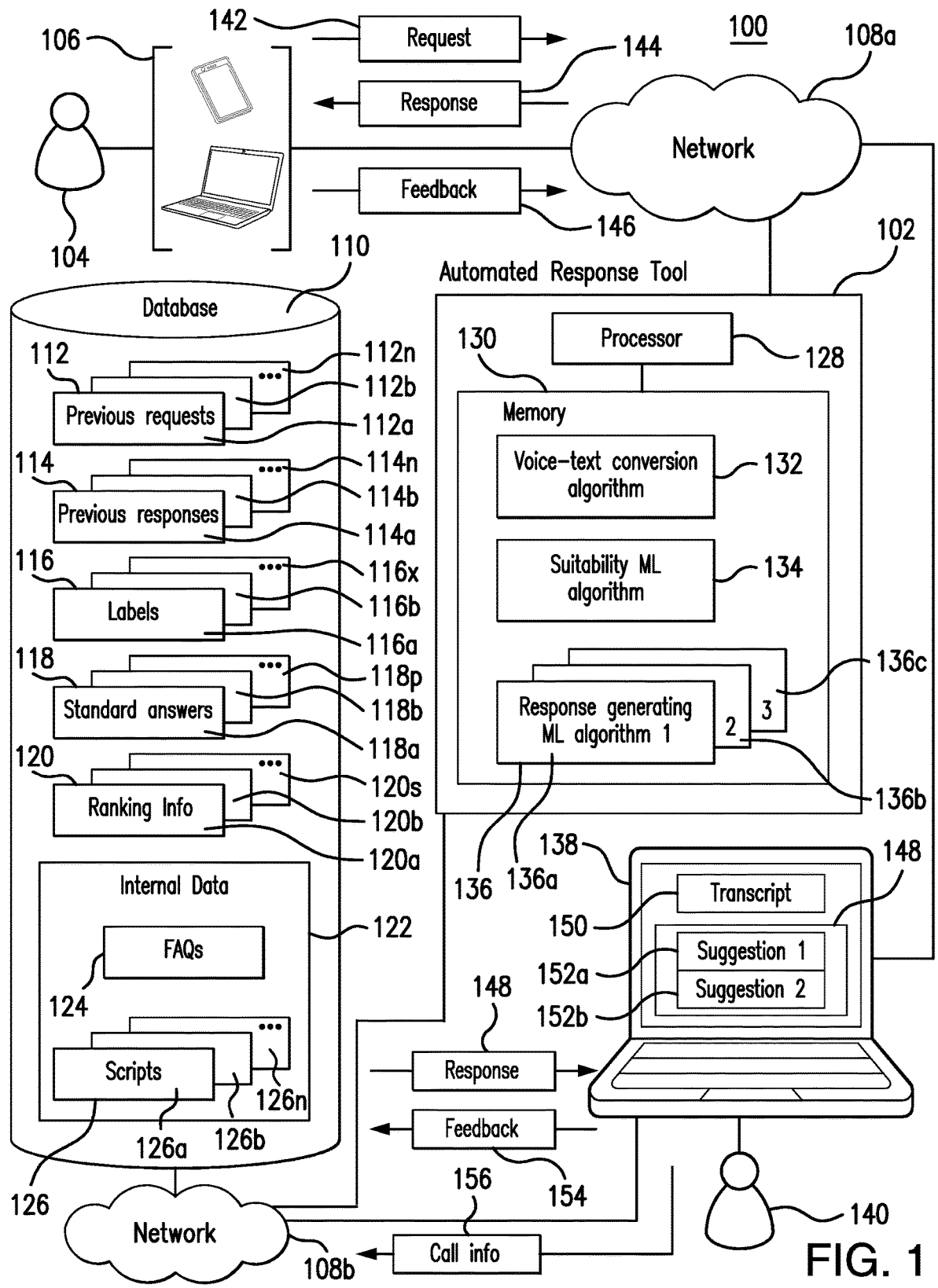

(51) Int. Cl.
  *G10L 15/10* (2006.01)
  *G06N 20/00* (2019.01)
  *G06F 16/33* (2019.01)
  *G06F 16/2457* (2019.01)

(56) References Cited

U.S. PATENT DOCUMENTS

| | | |
|---|---|---|
| 7,418,443 B2 | 8/2008 | Yoshimura et al. |
| 8,543,519 B2 | 9/2013 | Guyon et al. |
| 9,172,738 B1 | 10/2015 | daCosta |
| 9,189,538 B2 | 11/2015 | King et al. |
| 9,218,574 B2 | 12/2015 | Phillipps et al. |
| 9,245,287 B2 | 1/2016 | Gechter et al. |
| 9,336,526 B2 | 5/2016 | Tuchman et al. |
| 9,386,152 B2 | 7/2016 | Riahi et al. |
| 9,461,876 B2 | 10/2016 | Van Dusen et al. |
| 9,495,331 B2 | 11/2016 | Govrin et al. |
| 9,532,227 B2 | 12/2016 | Richards et al. |
| 9,591,427 B1 | 3/2017 | Lyren et al. |
| 9,690,815 B2 | 6/2017 | Cronin et al. |
| 9,730,298 B2 | 8/2017 | Vangeel et al. |
| 9,767,520 B2 | 9/2017 | Isaacson et al. |
| 9,799,041 B2 | 10/2017 | Karty et al. |
| 9,848,082 B1 | 12/2017 | Lillard et al. |
| 9,883,042 B1 | 1/2018 | Brown et al. |
| 9,990,565 B2 | 6/2018 | Rhoads et al. |
| 10,218,939 B2 | 2/2019 | Taylor et al. |
| 10,223,134 B1 | 3/2019 | Penilia et al. |
| 10,270,909 B2 | 4/2019 | Wolf |
| 10,360,214 B2 | 7/2019 | Gold |
| 10,366,332 B2 | 7/2019 | Bruno et al. |
| 10,424,296 B2 | 9/2019 | Penilia et al. |
| 10,452,863 B2 | 10/2019 | Miller |
| 10,504,193 B2 | 12/2019 | Isaacson et al. |
| 10,599,885 B2 | 3/2020 | Galitsky |
| 10,678,816 B2 | 6/2020 | Peng et al. |
| 10,713,574 B2 | 7/2020 | Baughman et al. |
| 10,770,073 B2 | 9/2020 | Piernot et al. |
| 10,893,141 B2 | 1/2021 | Segalls et al. |
| 2006/0204945 A1* | 9/2006 | Masuichi ............. G09B 7/02 434/322 |
| 2012/0089622 A1* | 4/2012 | Fan ............. G06F 16/334 707/E17.069 |
| 2014/0072948 A1* | 3/2014 | Boguraev ............. G09B 7/00 434/362 |
| 2014/0314225 A1 | 10/2014 | Riahi et al. |
| 2015/0039536 A1* | 2/2015 | Cook ............. G06F 16/24575 706/11 |
| 2016/0182666 A1 | 6/2016 | Rathod |
| 2018/0020093 A1 | 1/2018 | Bentitou |
| 2018/0133900 A1 | 5/2018 | Breazeal et al. |
| 2019/0213498 A1 | 7/2019 | Adjaoute |
| 2020/0160670 A1 | 5/2020 | Zalewski |
| 2020/0327252 A1 | 10/2020 | McFall |

* cited by examiner

SELECTIVE USE OF TOOLS FOR AUTOMATICALLY IDENTIFYING, ACCESSING, AND RETRIEVING INFORMATION RESPONSIVE TO VOICE REQUESTS

TECHNICAL FIELD

The present disclosure relates generally to information storage and retrieval, and more particularly, to the selective use of tools for automatically identifying, accessing, and retrieving information responsive to voice requests.

BACKGROUND

Organizations often store information within internal networks. This information may be relevant to individuals external to the organization. For example, an organization may store information related to accounts that are held by external individuals with the organization. Because such external individuals do not have access to the organization's internal network, in order to obtain information that is stored within the internal network these external individuals typically need to connect, over an external network, to an agent who is located within the internal network and who is able to access the requested information. This process may consume significant networking and bandwidth resources, particularly in situations in which (1) an external individual is placed on hold, while waiting to speak to an agent, or (2) an agent who is connected with an external individual over the external network has difficulty locating the requested information.

SUMMARY

According to one embodiment, an apparatus includes a memory and a hardware processor communicatively coupled to the memory. The memory stores a set of text associated with a request for information that is stored within an internal network. The memory also stores a first machine learning algorithm that is configured, when executed by a hardware processor, to use the set of text to select between automatically generating a reply to the request and transmitting the request to a device of an agent. The memory additionally stores a second machine learning algorithm that is configured, when executed by the hardware processor, to use the set of text and a first source of data to generate a first response to the request, the first source of data stored within the internal network. The hardware processor receives, from a user, a set of voice signals associated with the request. The processor also converts the set of voice signals into the set of text. The processor additionally uses the first machine learning algorithm to determine, based on the set of text, to automatically generate the reply to the request. This determination indicates that the set of text is associated with a probability that the automatically generated reply includes the information sought by the request that is greater than a threshold. In response to determining to automatically generate the reply, the processor uses the second machine learning algorithm to generate, based on the set of text and the first source of data, the first response to the request. The processor also transmits the first response to the user, as the reply to the request. In response to transmitting the reply to the request to the user, the processor receives feedback associated with the reply. The feedback indicates at least one of the reply to the request includes the information sought by the request, and the reply to the request does not includes the information sought by the request. The processor further uses the feedback to update at least one of the first machine learning algorithm and the second machine learning algorithm.

According to another embodiment, an apparatus includes a memory and a hardware processor communicatively coupled to the memory. The memory stores a set of previous requests, a set of previous responses, a first set of text, and a machine learning algorithm. Each previous response of the set of previous responses corresponds to at least one previous request of the set of previous requests. The first set of text is associated with a new request. The machine learning algorithm is configured, when executed by the hardware processor, to generate a set of groupings. Each grouping of the set of groupings includes a subset of the set of previous requests and is associated with at least one common feature, such that each previous request of the grouping includes the at least one common feature. The machine learning algorithm is also configured, when executed by the hardware processor, to assign the first set of text to a first grouping of the set of groupings. The first grouping includes a first subset of the set of previous requests. The assignment of the first set of text to the first grouping is based on a determination that the first set of text includes the at least one common feature associated with the first grouping. The first subset of the set of previous requests is associated with a first subset of the set of previous responses. In particular, each previous response of the first subset of the set of previous responses corresponds to at least one previous request of the first subset of the set of previous requests. In response to assigning the first set of text to the first grouping, the machine learning algorithm is further configured, when executed by the hardware processor, to generate a set of suggested responses. Each suggested response of the set of suggested responses corresponds to at least one previous response of the first subset of the set of previous responses. The hardware processor determines that a first user device transmitted a first set of voice signals associated with the new request. The processor also converts the first set of voice signals into the first set of text. The processor additionally transmits the first set of text to a device of a first agent of the set of agents. The processor further applies the machine learning algorithm to the first set of text to generate the set of suggested responses. The processor also transmits the set of suggested responses to the device of the first agent. The device of the first agent presents the first set of text and the set of suggested responses to the first agent on a display of the device. In response to transmitting the set of suggested responses, the processor determines that the device of the first agent transmitted a second set of voice signals generated by the first agent. The second set of voice signals corresponds to a communication from the first agent to the first user in response to the new request. The processor also converts the second set of voice signals into a second set of text. The processor additionally stores the first set of text in the set of previous requests stored in the memory. The processor further stores the second set of text in the set of previous responses stored in the memory, along with an indication that the second set of text corresponds to the first set of text.

According to a further embodiment, an apparatus includes a memory and a hardware processor communicatively coupled to the memory. The memory stores a first machine learning algorithm. The first machine learning algorithm is configured, when executed by the hardware processor, to use a set of text associated with a request for information stored within an internal network to select between forwarding the request to a device of an agent and transmitting a reply to the request. The reply is automatically generated based on the set of text and a first source of data stored within the internal network. The hardware processor receives feedback for a decision made by the first machine learning algorithm. The decision made by the first machine learning algorithm is either a decision to forward the request to the device of the agent, or a decision to transmit the automatically generated reply to the request. The feedback indicates either that the automatically generated reply includes the information sought by the request, or that the automatically generated reply does not include the information sought by the request. The processor also assigns a reward value to the feedback. The reward value is either a first positive reward value, a second positive reward value, a first negative reward value, or a second negative reward value. The first positive reward value is assigned when the decision made by the first machine learning algorithm is the decision to forward the request to the device of the agent and the feedback indicates that the automatically generated reply does not include the information sought by the request. The second positive reward value is assigned when the decision made by the first machine learning algorithm is the decision to transmit the automatically generated reply to the request and the feedback indicates that the automatically generated reply includes the information sought by the request. The first negative reward value is assigned when the decision made by the first machine learning algorithm is the decision to forward the request to the device of the agent and the feedback indicates that the automatically generated reply includes the information sought by the request. The second negative reward value is assigned when the decision made by the first machine learning algorithm is the decision to transmit the automatically generated reply and the feedback indicates that the automatically generated reply does not include the information sought by the request. The processor additionally uses the reward value to update the first machine learning algorithm.

Certain embodiments provide one or more technical advantages. As an example, an embodiment reduces the computational resources expended by a system in responding to requests from users, as compared with existing systems that are used by organizations to respond to such requests. For instance, existing systems typically assign users (who have connected to the system over a network) to agents who are responsible for responding to the users' requests. However, if at any given time more users are connected to such an existing system than there are available agents, one or more of the users may be required to wait in a queue before being connected to an agent, potentially wasting significant networking resources. For example, when a user remains on hold for a long period of time, the user is consuming bandwidth and networking resources in an inefficient manner. In contrast, rather than relying exclusively on agents to respond to user requests, certain embodiments are configured to implement one or more machine learning algorithms to automatically respond to such requests. This reduces the length of time that a user remains on hold and thereby reduces the consumption of bandwidth and other networking resources. As another example, an embodiment conserves computational resources by implementing a machine learning algorithm that is configured to distinguish between those requests from users that are suitable for automatic response and those requests that are more appropriate for agent response. In this manner, certain embodiments are able to employ computational resources (as well as agent resources) in an efficient manner. For example, by automatically determining that a given request is not suitable for automatic response and, based on such determination, connecting the user who submitted the request to an agent, certain embodiments conserve the processing and networking resources that would otherwise be expended by automatically generating one or more potential responses to the request and evaluating these potential responses to determine that none of them are suitable, before subsequently connecting the user to an agent. As a further example, certain embodiments use one or more machine learning algorithms to analyze a request that has been communicated from a user to an agent, and to provide the agent with real time suggestions of potential responses to the request. By providing the agent with suggested responses in real time, certain embodiments reduce the time needed for the agent to provide the response to the user, thereby reducing the bandwidth and other networking resources consumed by the connection between the user and the agent.

The system described in the present disclosure may particularly be integrated into a practical application of a tool for use by an organization that operates an information line or call center through which users may communicate requests to agents of the organization. Rather than placing a user on hold after the user calls into the information line, the tool is designed to automatically inquire into the user's reason for calling, receive a request from the user, convert the user's request into text, and then apply a machine learning algorithm to the text to determine whether or not the request is suitable for automatic response. If the tool determines that the request is of a type that is suitable for automatic response, the tool applies one or more additional machine learning algorithms to the text, to generate a response to the request, and communicates the response to the user. If the tool determines that the request is not suitable for automatic response, the tool connects the user to an agent, and uses one or more of the additional machine learning algorithms to provide suggested responses to the agent.

Certain embodiments may include none, some, or all of the above technical advantages. One or more other technical advantages may be readily apparent to one skilled in the art form the figures, descriptions, and claims included herein.

BRIEF DESCRIPTON OF THE DRAWINGS

For a more complete understanding of the present disclosure, reference is now made to the following description, taken in conjunction with the accompanying drawings, in which:

FIG. 1 illustrates an example automated response system; and

Figure 2A:
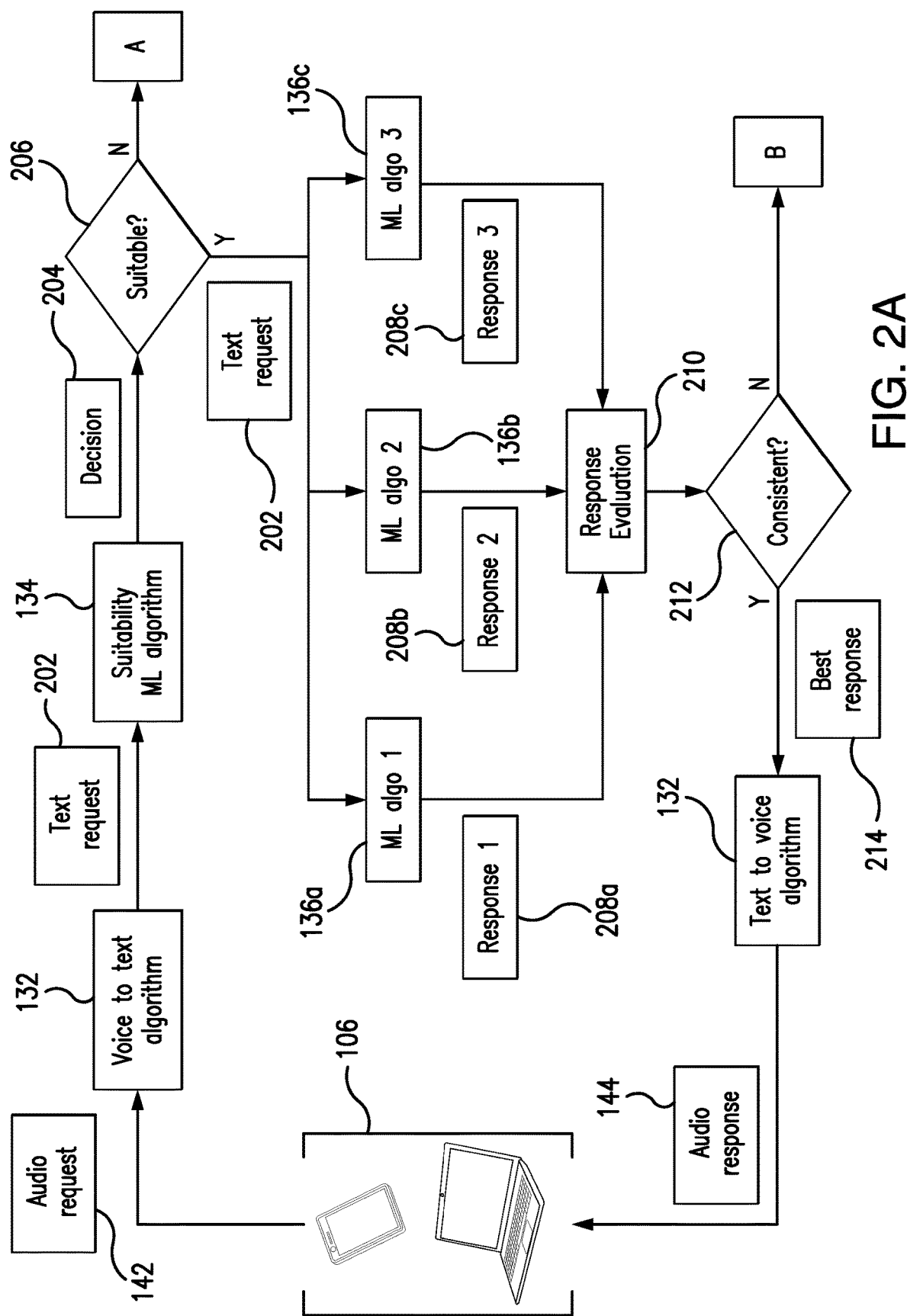
Figure 2B:
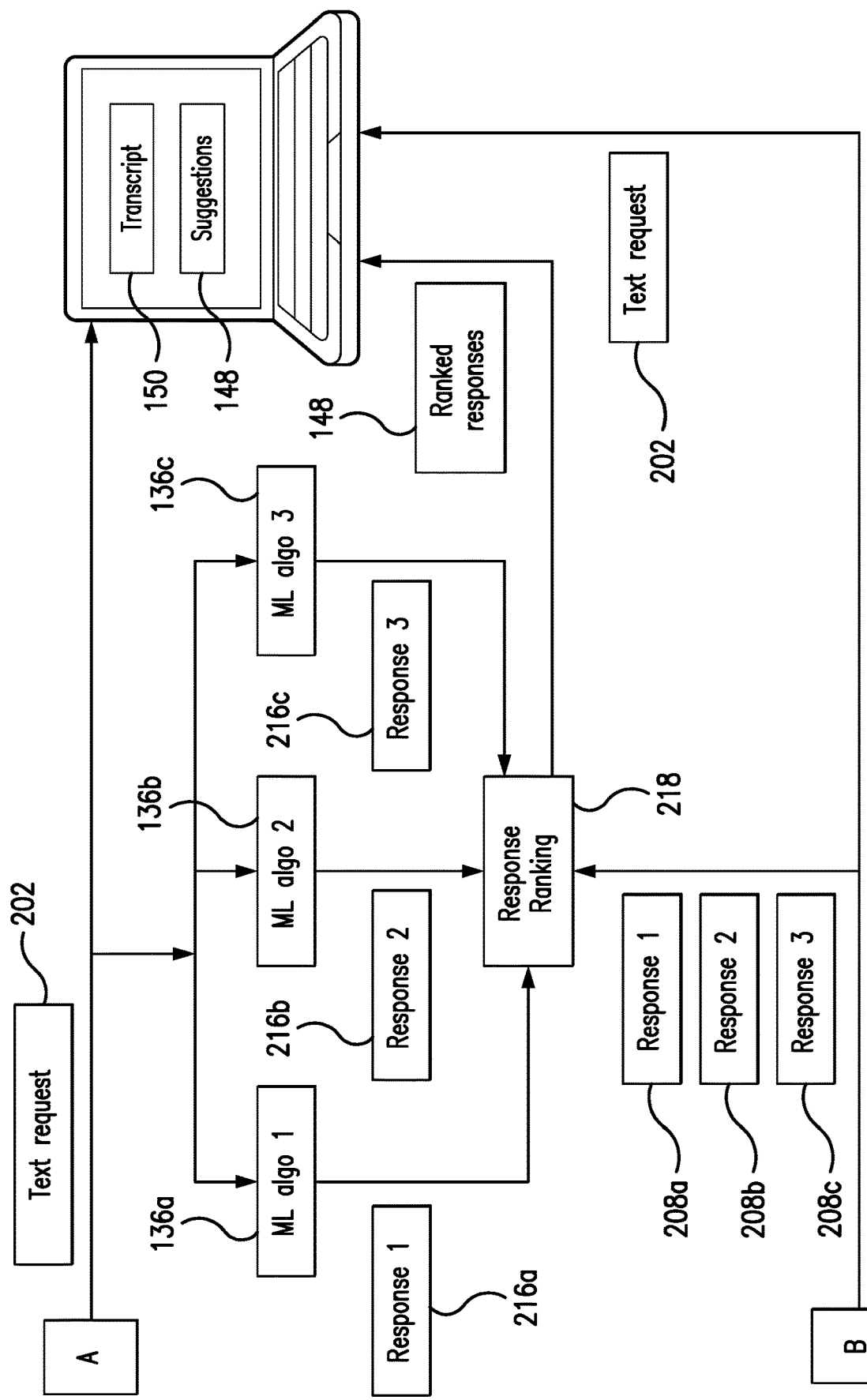
Figure 3:
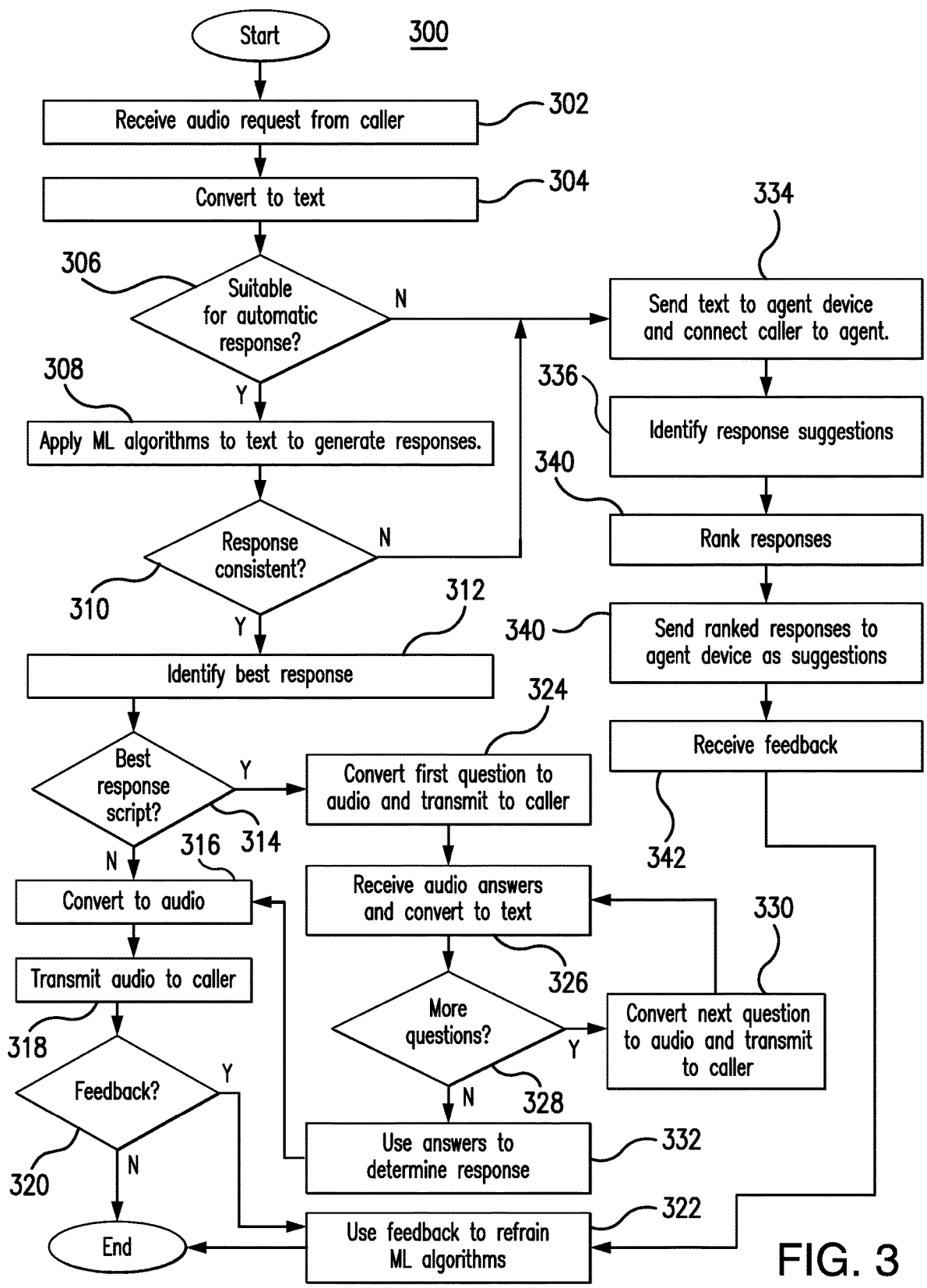

FIGS. 2A and 2B illustrates an example operation of the automated response tool of the system of FIG. 1, to analyze requests received from users and automatically generate responses to the received requests; and FIG. 3 presents a flowchart illustrating an example method by which the automated response tool of the system of FIG. 1 receives requests, automatically generates responses to the received requests, receives feedback associated with the automatically generated responses, and uses this feedback to update one or more of the machine learning algorithms that were used to generate the responses.

DETAILED DESCRIPTION

Embodiments of the present disclosure and its advantages may be understood by referring to FIGS. 1 and 3 of the drawings, like numerals being used for like and corresponding parts of the various drawings.

I. System Overview

FIG. 1 illustrates an example automated response system 100 that includes automated response tool 102, user(s) 104, device(s) 106, internal network 108a, external network 108b, database 110, agent device(s) 138, and agent(s) 140. Generally, automated response tool 102 receives voice requests 142 from users 104, who are seeking information stored on internal network 108b. In response to receiving a voice request 142, the tool uses voice-to-text conversion algorithm 132 to convert the voice request into a text version of the request. The tool then applies machine learning algorithm 134 to the text version of the request, to decide between automatically generating a response to request 142, or forwarding the request to agent 140. The manner by which tool 102 makes such a decision is described in further detail below, and in the discussion of FIG. 2A. If tool 102 decides to generate an automatic response to the request, tool 102 applies one or more response generating machine learning algorithms 136 to the text version of request 142, to automatically generate a textual response to the request, which the tool subsequently converts to audio response 144. Response generating machine learning algorithms 136 are trained to generate responses 144 based on information stored in database 110. Such information may include previous responses 114 that have been provided by agents 140 to previous requests 112 submitted by users 104, standard answers 118 that have been developed for certain types of requests 142, information available in internal FAQ pages 124, and/or any other suitable information. After generating response 144, tool 102 transmits the response to user 104. Further details of the manner by which automated response tool 102 automatically generates responses 144 are provided below, and in the discussion of FIG. 2A. On the other hand, if automated response tool 102 decides to forward the request to agent 140, it does so by (1) transmitting the text version of the request 142 to agent device 138 (for display as transcript 150), and (2) connecting user 104 with agent 140 (by connecting user device 106 to agent device 138 over network 108a). Tool 102 additionally applies one or more of the response generating machine learning algorithms 136 to the text version of request 142, to generate a set of suggested responses 148 to the request. Tool 102 transmits these suggested responses 148 to agent device 138, for display to agent 140. Agent 140 may make use of suggested responses 148 by: (1) selecting one of the suggested responses to use as response 144, or (2) modifying and/or combining one or more of the suggested responses to generate response 144. Alternatively, agent 140 may choose to reject the suggested responses and to generate a new response 144. Details of the manner by which automated response tool 102 generates suggested responses 148 are provided below and in the discussion of FIG. 2B.

Devices 106 are used by users 104 located on network 108a to communicate with automated response tool 102, and/or agent device 138. As an example, in certain embodiments, user 104 may use device 106 to connect to automated response tool 102 over network 108a, in order to submit voice requests 142 to tool 102. For example, user 104 may use device 106 to connect to automated response tool 102 by: (1) entering a telephone number associated with tool 102, (2) accessing an audio chat feature of a webpage associated with tool 102, and/or (3) performing any other suitable action to connect device 106 to tool 102. Once connected to device 102 over network 108a, user 104 may use device 106 to send voice requests 142 to tool 102, and to receive audio responses 144 from tool 102. In certain embodiments, automated response tool 102 may connect device 106 to agent device 138, by generating a connection between user device 106 and agent device 138 over network 108a. In such embodiments, user 104 may use device 106 to send voice requests 142 to agent device 138, and to receive voice responses 144 transmitted by agent 140 using agent device 138. In certain embodiments, device 106 may be used by user 104 to provide feedback 146 to tool 102. Feedback 146 may include any information provided by user 104 about responses 144. For example, feedback 146 associated with a response 144 may include (1) an indication that user 104 was satisfied with the response, (2) an indication that user 104 was not satisfied with the response, (3) a rating of the response, (4) an indication that user 104 prefers receiving responses that are generated by agents 140 to responses that are automatically generated by tool 102, (5) an indication that user 104 prefers receiving responses that are automatically generated by tool 102 to responses that are generated by agents 140, and/or (6) any other suitable information associated with response 144 that user 104 may communication to tool 102.

Devices 106 include any appropriate device for communicating with components of system 100 over network 108a. For example, devices 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving voice communications over network 108a. In certain embodiments, device 106 may include an integrated speaker and/or microphone. In some embodiments, an external speaker and/or microphone may be connected to device 106. Device 106 may also include any other suitable user interfaces, such as a display, a keypad, or other appropriate terminal equipment usable by user 104. In some embodiments, an application executed by a processor of device 106 may perform the functions described herein.

System 100 may include both an external network 108a and an internal network 108b. Internal network 108b is associated with the organization to which automated response tool 102 belongs, and facilitates communications between automated response tool 102, database 110, and agent devices 138. External network 108a facilitates communication between devices 106, which may not be located on internal network 108b, and components of system 100 (e.g., automated response tool 102 and/or agent device 138) that are located on internal network 108b. External network 108a and/or internal network 108b may include any interconnecting systems capable of transmitting audio, video, signals, data, messages, or any combination of the preceding. For example, external network 108a may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between devices 106 and tool 102 and/or between device 106 and agent devices 138. Similarly, internal network 108b may include all or a portion of a private data network, a local area network (LAN), a metropolitan area network (MAN), a wide area network (WAN), a local or regional communication or computer network, a wireline or wireless network, an enterprise intranet, or any other suitable communication link, including combinations thereof, operable to facilitate communication between automated response tool 102, database 110, and/or agent devices 138. While illustrated in FIG. 1 and described above as being separate networks, in certain embodiments, network 108a and network 108b may correspond to the same network. For example, in certain embodiments automated response tool 102 may be used to generate responses to requests 142 from employees and/or other users 104 associated with the organization to which automated response tool 102 belongs. In such embodiments, network 108a and network 108b may both correspond to the organization's internal network. As another example, in certain embodiments, network 108a and network 108b may both correspond to an external network.

Database 110 stores any type of data that may be used by automated response tool 102 to generate responses 144/148. For example, as illustrated in FIG. 1, database 110 may store a set of previous requests 112, a set of previous responses 114, a set of labels 116, a set of standard answers 118, a set of ranking information 120, and/or other internal data 122, such as FAQ pages 124 and/or question and answer templates/scripts 126.

Set of previous requests 112 includes requests 112a through 112n that have previously been submitted to automated response tool 102 and/or agent 140 by users 104. In certain embodiments, the set of previous requests 112 includes requests 112a through 112n that have previously been generated as examples of requests that may be submitted to tool 102 by users 104. In certain embodiments, the set of previous requests 112 includes one or more requests 112a through 112n for information that is stored within internal network 108b (e.g., information stored in database 110). As an example, where users 104 hold accounts at the organization to which automated response tool 102 belongs, the set of previous requests 112 may include requests for information associated with the accounts of those users. For example, previous requests 112a through 112n may include a request for an up-to-date balance of a user's account, a request for information about any pending transactions associated with the account, a request for information about a policy of the organization, a request for an explanation of an action taken by the organization, and/or any other suitable request for information. In some embodiments, the set of previous requests 112 may include one or more requests 112a through 112n for actions to be performed using information that is stored within internal network 108b (e.g., information stored in database 110). As an example, where users 104 hold accounts at the organization to which automated response tool 102 belongs, the set of previous requests 112 may include requests for actions associated with the users' accounts to be performed. For example, previous requests 112a through 112n may include a request to update personal information associated with an account, a request to process a transaction associated with an account, a request to activate a card associated with an account, and/or any other suitable request for an action associated with an account to be performed.

Set of previous responses 114 includes responses 114a through 114n that have previously been generated by agents 140. In certain embodiments, set of previous responses 114 includes responses that have previously been generated by automated response tool 102. Each previous response 114a through 114n is associated with a previous request 112a through 112n, and corresponds to the response that was provided by an agent 140 (and/or tool 102) to the associated previous request. For example, previous response 114a is associated with previous request 112a, and corresponds to the response that was provided by an agent 140 to previous request 112a. Previous responses 114a through 114n may provide to users 104 information that is stored in internal network 108b (e.g. information stored in database 110). As an example, consider a previous request 112a that includes the text: "What are your hours of operation?" A previous response 114a that is associated with previous request 112a may include the text: "Monday through Friday, from 8 am to 5 pm." In certain embodiments, previous responses 114a through 114n may include instructions that may be followed in order to access information sought by the associated previous request 112, that is specific to a user 104. For example, consider a previous request 112b that was submitted by a user 104 and that includes the text: "What is my account balance?" A previous response 114b that is associated with this previous request may include a log of the steps that were performed by agent 140 in providing user 104 with the specific balance of his/her account. Previous response 114b may also include the words spoken by agent 140 in providing the account balance back to user 104. For instance, previous response 114b may include the words: "Your account has a current balance of $1,000." In certain embodiments, previous responses 114a through 114n may include information about actions that have been performed using information that is stored in internal network 108b. As an example, consider a previous request 112c that includes the text: "I want to activate my card." A previous response 114c that is associated with previous request 112c may include the text: "Your card is now activated." Previous response 114b may also include instructions for performing this activation, such as a log of the steps that were taken by the agent 140 who performed the card activation, in response to receiving previous request 112c.

Previous requests 112a through 112n, and previous responses 114a through 114n may be stored in database 110 in any suitable format. For example, previous requests 112a through 112n and/or previous responses 114a through 114n may be stored as text in database 110. In certain embodiments (for example, embodiments in which database 110 is a relational database), each previous response 114a through 114n is linked to the associated previous request 112a through 112n in database 110. In certain embodiments, automated response tool 102 may update the set of previous requests 112 and/or the set of previous responses 114 in response to receiving a new request 142 from user 104 and/or providing a new response 144 back to the user. In certain embodiments, one or more of previous requests 112a through 112n may correspond to a single question posed by a user 104. In some embodiments, one or more of previous requests 112a through 112n may include all or a portion of a conversation between a user 104 and an agent 138 during which user 104 presented the request to agent 138. Similarly, in certain embodiments, one or more of previous responses 114a through 114n may correspond to a single statement provided by an agent 138 in response to the corresponding request 112 from a user 104. In some embodiments, one or more of previous responses 114a through 114n may correspond to all or a portion of a conversation between a user 104 and an agent 138 during which agent 138 provided the response to user 104.

In certain embodiments, database 110 may also store a set of labels 116 and a set of standard answers 118. Each label 116a through 116p may correspond to a specific category of requests that may be received by tool 102. For example, an "account balance" label 116a may be associated with a category that includes requests that all seek the current balance of a user's account. Similarly, a "business hours" label 116b may be associated with a category that includes requests that all seek information about the organization's hours of operations. In certain embodiments, each label 116a through 116p is associated with one or more example requests that belong to the specific category to which the label corresponds. Such example requests may include requests that have not yet been received by automated response tool 102 and/or one or more of previous requests 112a through 112n. As an example, the "account balance" label 116a may be associated with example requests such as: "What is my account balance?"; "How much is in my account?"; and "What is the current balance of my account?" Similarly, the "business hours" label 116b may be associated with example requests such as: "What are your business hours?"; "When are you open?"; and "What time can I visit?"

A standard answer 118a through 118p is assigned to each label 116a through 116p. Each standard answer 118a through 118p corresponds to a standardized response that may be provided as a reply to any request that belongs to the category associated with the corresponding label 116a through 116p. For example, standard answer 118b may be assigned to the "business hours" label 116b, and may include the following text: "Daily hours of operation are from 8 am to 5 pm, Monday through Friday." In certain embodiments, one or more standard answers 118a through 118p may include instructions to be executed by automated response tool 102 and/or agent 140 in order to provide information that is responsive to requests falling into the category of requests that is associated with the corresponding label 116a through 116p. For example, standard answer 118a may be assigned to the "account balance" label 116a and may include instructions that, when executed, provide an up to date balance of the account belonging to a given user 104.

Labels 116a through 116p, and standard answers 118a through 118p may be stored in database 110 in any suitable format. As an example, labels 116a through 116p and/or standard answers 118a through 118p may be stored as text in database 110. For instance, each label 116a through 116p may be stored in database 110 as a textual description of the category of requests that is associated with the label. In some embodiments, each label 116a through 116p may be stored in database 110 as a number and/or any other suitable identifier. In certain embodiments (for example, embodiments in which database 110 is a relational database), each label 116a through 116p may be linked in database 110 to: (1) each example request that is associated with the label; and/or (2) the standard answer of answers 118a through 118p that is associated with the label. In certain embodiments, agent 140 may update set of labels 116 and/or set of standard answers 118 using agent device 138. For example, in some embodiments, automated response tool 102 may provide agent device 138 with statistics and/or other metrics about the requests 142 that are submitted to the tool. Agent 140 may use this information to identify a new category of requests that are frequently submitted to automated response tool 102, where this new category is not currently associated with any of labels 116a through 116p. In response, agent 140 may create a new label 116 and a new standard answer 118 for the newly identified category, and store both in database 110.

Set of labels 116 may additionally include any other type of label that may be used to label previous requests 112 and/or previous responses 114. For example, in certain embodiments, set of labels 116 includes a subset of labels 116o through 116x that are associated with previous requests 112a through 112n. This subset of labels 116 is used to label each previous request 112a through 112n as either a request 112 for which automated response tool 102 was able to generate a suitable response 114 or a request 112 for which automated response tool 102 was unable to generate a suitable response. The determination that a response generated by tool 102 to request 112 is suitable/unsuitable may be made in any suitable manner. For example, in certain embodiments, the determination is made based on (1) feedback received from user 104, (2) feedback received from agent 140, and/or (3) one or more factors considered by automated response tool 102. For instance, automated response tool 102 may label a request 112 as unsuitable for automated response where: (1) none of machine learning algorithms 136a through 136c were able to generate a response to the request that was associated with a suitable confidence level (e.g., a probability that the response included the information sought by the request that was greater than a threshold); (2) two or more of the responses generated by machine learning algorithms 136a through 136c were inconsistent with one another (e.g., a first response generated by a first machine learning algorithm 136a did not include any of the information included in a second response generated by a second machine learning algorithm 136b, the second response didn't include any of the information included in the first response, and/or a similarity metric calculated between the text of the first response and the text of the second response is less than a threshold value); and/or (3) for any other suitable reason. In certain embodiments, automated response tool 102 may use such labels 116 to train one or more of suitability machine learning algorithm 134 and response generating machine learning algorithms 136a through 136c.

Set of ranking information 120 includes any information that may be used to evaluate the effectiveness of previous responses 114a through 114n, and/or standard answers 118a through 118p, as determined by one or more metrics established by the organization to which automated response tool 102 belongs. For example, for each previous response 114a through 114n and/or each standard answer 118a through 118p, ranking information 120 may include (1) feedback 146 provided by user 104 about the response/answer, (2) feedback 154 provided by agent 140 about the response/answer, (3) information 156 about the time that it took for the response/answer to be delivered to user 104, (4) an approval rating of the agent 140 who delivered the response/answer (determined, for example, based on feedback 146 and/or 154 associated with the agent), and/or (5) any other suitable information about previous responses 114a through 114n and/or standard answers 118a through 118p. In certain embodiments, automated response tool 102 may use ranking information 120 to calculate a score for each previous response 114 and/or standard answer 118. A low score may indicate that the response is an ineffective response (e.g., it is associated with negative feedback, it has been deemed complex, for example, based on the average time taken to deliver the response being greater than a threshold amount, and/or it is associated with any other negative features). On the other hand, a high score may indicate that the response is an effective response (e.g., it is associated with positive feedback, it has been deemed simple, for example, based on the average time taken to deliver the response being less than a threshold amount, and/or it is associated with any other positive features). Automated response tool 102 may use these scores, and/or any other ranking information 120 to generate responses 144/148, as described in further detail below, in the discussion of FIGS. 2A and 2B.

Internal data 122 may include any data sources stored within internal network 108b that may be used by automated response tool 102 to generate responses 144/148 to requests 142 received from users 104. As an example, in certain embodiments, internal data 122 includes a set of data 124 associated with one or more frequently asked question (FAQ) pages operated by the organization to which database 110 belongs. Such FAQ data 124 may include a set of answers to common user questions. As another example, in certain embodiments, internal data 122 includes a set of customer service templates/scripts 126. Each template/script 126a through 126n may correspond to a specific type of request 142 and may include a series of questions for which responses are needed in order to process the request. For example, a first template/script 126a may correspond to a user request to report a lost card that is associated with a user's account. Accordingly, this template/script 126a may include: (1) one or more questions that are to be used to verify the user's identity; (2) one or more questions about the last time the user used the card; (3) a question asking if the user would like a replacement card; and/or (4) any other suitable questions.

While, for simplicity, FIG. 1 illustrates previous requests 112, previous responses 114, labels 116, standard answers 118, ranking information 120, and internal data 122 all stored within a single database 110, this data may be distributed, in any manner, across any number of data storage locations 110. Data storage locations 110 may include one or more relational databases, non-relational databases, one or more centralized databases, one or more distributed databases, and/or any other data storage systems.

Agent devices 138 are used by agents 140 to: (1) receive and display transcripts 150 of communications between users 104 and automated response tool 102; (2) communicate with users 104 over external network 108a; (3) receive suggested responses 148 to users' requests 142 from automated response tool 102 over internal network 108b; (4) provide feedback about the suggested responses 148 to automated response tool 102; and/or (5) perform any other suitable function. While FIG. 1 illustrates a single agent 140 and a single agent device 138, system 100 may include any number of agents 140 and any number of agent devices 138. In certain embodiments, agent device 138 may represent two of more physical devices. For example, agent device 138 may correspond to a first device that agent 140 uses to communicate with user 104, and a second device that agent 140 uses to receive transcript 150 and/or suggested responses 148 from automated response tool 102.

Agent devices 138 include any appropriate devices for (1) communicating with device 106 over external network 108a, and (2) communicating with automated response tool 102 and/or database 110 over internal network 108b. For example, agent devices 138 may be a telephone, a mobile phone, a computer, a laptop, a wireless or cellular telephone, a tablet, a server, an IoT device, and/or an automated assistant, among others. This disclosure contemplates agent devices 138 being any appropriate device for (1) sending and receiving voice communications over external network 108a, and (2) sending and receiving data over internal network 108b. A single agent device 138 may be used to perform these functions or these functions may be split across multiple agent devices 138. For example, in certain embodiments, agent uses a telephone or mobile phone to send and receive voice communications over external network 108a, and the agent uses a computer to send and receive data over internal network 108b. In certain embodiments, agent device 138 may include an integrated speaker and/or microphone. In some embodiments, an external speaker and/or microphone may be connected to agent device 138. Agent device 138 may also include any other suitable user interfaces, such as a display, a keypad, or other appropriate terminal equipment usable by agent 140. In some embodiments, an application executed by a processor of agent device 138 may perform the functions described herein.

As seen in FIG. 1, automated response tool 102 includes a processor 128 and a memory 130. This disclosure contemplates processor 128 and memory 130 being configured to perform any of the functions of automated response tool 102 described herein. Generally automated response tool 102 (1) receives voice request 142 from user 104; (2) uses voice-to-text conversion algorithm 132 to convert voice request 142 into a text version of the request; (3) applies suitability machine learning algorithm 134 to the text version of voice request 142 to decide between automatically generating a response to the request or forwarding the request to agent 140; (4) in response to deciding to automatically generate a response to the request, (a) applies one or more response generating machine learning algorithms 136a through 136c to the text version of request 142 to generate response 144, and (b) transmits response 144 to user device 106; (5) in response to deciding to forward the request to agent 140, (a) connects user device 106 to agent device 138, (b) transmits a transcript 150 of the communications between user 106 and automated response tool 102 to agent device 138, (c) applies one or more of response generating machine learning algorithms 136a through 136c to the text version of request 142 to generate one or more suggested responses 148, and (d) transmits these suggested responses 148 to agent device 138; (6) receives information about response 144 and/or information about suggested responses 148 from user 104 and/or agent 140 in the form of user feedback 146, agent feedback 148, and/or call information 156; (7) uses this information to update one or more of machine learning algorithms 134/136 and/or ranking information 120; and/or (8) performs any other suitable function. The manner by which automated response tool 102 performs these functions are described in detail below, in the discussion of FIGS. 2A, 2B, and 3.

Processor 128 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 130 and controls the operation of automated response tool 102. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 128 may include other hardware and software that operates to control and process information. Processor 128 executes software stored on memory 130 to perform any of the functions described herein. Processor 128 controls the operation and administration of automated response tool 102 by processing information received from device(s) 106, database 110, agent device(s) 138, and/or memory 130. Processor 128 may be a programmable logic device, a microcontroller, a microprocessor, any suitable processing device, or any suitable combination of the preceding. Processor 128 is not limited to a single processing device and may encompass multiple processing devices.

Memory 130 may store, either permanently or temporarily, data, operational software, or other information for processor 128. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 128 to perform one or more of the functions described herein.

In certain embodiments, memory 130 may also store voice-text conversion algorithm(s) 132, suitability machine learning algorithm 134, and one or more response generating machine learning algorithms 136a through 136c. Voice-text conversion algorithms 132 includes one or more algorithms that are configured to convert between voice signals (e.g., speech) and text. For example, voice-text conversion algorithms 132 may include one or more algorithms to translate speech into text. Similarly, voice-text conversion algorithms 132 may include one or ore algorithms to translate text into voice signals. In certain embodiments, voice-text conversion algorithm 132 is a single algorithm that is configured to perform both of these functions. In some embodiments, voice-text algorithm 132 includes one or more voice-to-text algorithms to convert speech into text and one or more text-to-voice algorithms to convert text into audio. Voice-text conversion algorithms 132 may include any suitable algorithms to convert from speech to text and/or text to speech, such as a hidden Markov model, a dynamic time warping-based algorithm, a neural network, a concatenation synthesis algorithm, a format synthesis algorithm, an articulatory synthesis algorithm, and/or any other suitable algorithms.

Suitability machine learning algorithm 134 is used by automated response tool 102 to decide between automatically generating a response 144 to a user request 142, or forwarding the request to agent 140. Suitability machine learning algorithm 134 is an algorithm that is configured to predict, for a given request 142, whether or not automated response tool 102 will be able to generate a suitable response to the request (e.g., a response that includes the information sought by the request, a response for which user 104 will likely provide positive feedback 146, and/or a response that complies with any other reasonable measure of suitability). In certain embodiments, suitability machine learning algorithm 134 is configured to take, as input, a text version of request 142, and to generate, as output, a probability that automated response tool 102 will be able to generate a suitable response to the request. Automated response tool 102 may compare the outputted probability with a given threshold, to determine whether or not to generate an automatic response to the request (e.g., determine to generated an automatic response, where the outputted probability is greater than the threshold; determine to forward the request to agent 140, where the outputted probability is less than the threshold).

Suitability machine learning algorithm 134 may be trained to determine whether or not automated response tool 102 will be able to generate a suitable response 144 for a given request 142 in any suitable manner. For example, in certain embodiments, suitability machine learning algorithm 134 is trained to perform this function based on a set of previous requests 112 and a set of labels 116 associated with the previous requests. Each label 116 is assigned to a previous request 112 and indicates whether or not automated response tool 102 was previously able to generate a suitable response to the request, where the suitability of a given response may have been determined in any manner. For example, a request 142 may be assigned a label 116 that indicates that automated response tool 102 was previously unable to generate a suitable response 144 to the request if: (1) none of response generating machine learning algorithms 136a through 136c were able to generate a response to the request that was associated with at least a threshold confidence level; (2) two or more of the responses generated by machine learning algorithms 136a through 136c conflict with one another; (3) negative feedback 146 associated with the response was received from user 104; (4) negative feedback 154 associated with the response was received from agent 140; and/or (5) any other suitable reason. In certain embodiments, automated response tool 102 is configured to train suitability machine learning algorithm 134.

Suitability machine learning algorithm 134 may be any machine learning algorithm capable of selecting between two choices. For example, suitability machine learning algorithm 134 may be a neural network, a logistic regression algorithm, a k-nearest neighbors algorithm, a decision tree algorithm, a support vector machine algorithm, a naïve Bayes algorithm, and/or any other suitable machine learning algorithm. In certain embodiments, suitability machine learning algorithm 134 is a reinforcement learning algorithm that is rewarded for correct decisions and punished for incorrect decisions. In such embodiments, automated response tool 102 may be configured to evaluate each decision made by suitability machine learning algorithm 134 after the fact, to determine whether or not the decision was correct. As an example, automated response tool 102 may determine that a decision to automatically generate a response to request 142 was incorrect, where: (1) none of response generating machine learning algorithms 136a through 136c were able to generate a response to the request that was associated with at least a threshold level of confidence in the response; (2) two or more of the responses generated by machine learning algorithms 136a through 136c conflicted with one another; (3) negative feedback 146 associated with the response was received from user 104; and/or (4) negative feedback 154 associated with the response was received from agent 140. In response to determining that the decision to automatically generate a response to request 142 was incorrect, automated response tool 102 may provide a first punishment value to suitability machine learning algorithm 134, and use the punishment value to update the algorithm. As another example, automated response tool 102 may determine that a decision to automatically generate a response to request 142 was correct, where: (1) one or more of response generating machine learning algorithms 136a through 136c was able to generate a response to the request that was associated with at least a threshold level of confidence in the response; (2) none of the responses generated by machine learning algorithms 136a through 136c conflicted with one another; (3) positive feedback 146 associated with the response was received from user 104; and/or (4) positive feedback 154 associated with the response was received from agent 140. In response to determining that the decision to automatically generate a response to request 142 was correct, automated response tool 102 may provide a first reward value to suitability machine learning algorithm 134, and use the reward value to update the algorithm.

Similarly, automated response tool 102 may evaluate whether or not a decision to forward request 142 to agent 140 was correct, by attempting to generate an automatic response to the request, and then evaluating the automatically generated response (if any). As an example, automated response tool 102 may determine that a decision to forward request 142 to agent 140 was correct, where: (1) none of response generating machine learning algorithms 136a through 136c were able to generate a response to the request that was associated with at least a threshold level of confidence in the response; (2) two of more of the responses generated by machine learning algorithms 136a through 136c conflicted with one another; and/or (3) negative feedback 154 associated with the response was received from agent 140, after automated response tool 102 presented the automatically generated response to agent 140 as a suggested response 148. In response to determining that the decision to forward request 142 to agent 140 was correct, automated response tool 102 may provide a second reward value to suitability machine learning algorithm 134, and use the reward value to update the algorithm. As another example, automated response tool 102 may determine that a decision to forward request 142 to agent 140 was incorrect, where: (1) one or more of response generating machine learning algorithms 136a through 136c were able to generate a response to the request that was associated with at least a threshold level of confidence in the response; (2) none of the responses generated by machine learning algorithms 136a through 136c conflicted with one another; and/or (3) positive feedback 154 associated with the response was received from agent 140, after automated response tool 102 presented the automatically generated response to agent 140 as a suggested response 148. In response to determining that the decision to forward request 142 to agent 140 was incorrect, automated response tool 102 may provide a second punishment value to suitability machine learning algorithm 134, and use the punishment value to update the algorithm.

The set of response generating machine learning algorithms 136 includes one or more machine learning algorithms that are each configured to generate a text version of a response 144 to a request 142, based on a text version of the request. While illustrated in FIG. 1 as including three response generating machine learning algorithms 136a through 136c, this disclosure contemplates that automated response tool 102 may use any number of response generating machine learning algorithms 136a through 136c.

Response generating machine learning algorithms 136a through 136c may include supervised machine learning algorithms, unsupervised machine learning algorithms. semi-supervised learning algorithms, reinforcement learning algorithms, and/or any other type of suitable machine learning algorithms. As an example, response generating machine learning algorithm 136a may be a supervised machine learning algorithm that has been trained using a set of labels 116 and a set of example requests and/or previous requests 112 that have been assigned to each label 116. Each label 116 may correspond to a particular user intent and be assigned a standard answer 118, which may be used to respond to requests associated with that intent. For example, requests such as "What are your business hours?"; "How late are you open until?"; and "When are you open?", may all be labeled with the intent 116a of "business hours," to which the standard answer 118a of "Monday through Friday, from 8 am to 5 pm" is assigned. Based on the set of labeled example requests and/or labeled previous requests 112, machine learning algorithm 136a may be trained to take, as input, text associated with a given request 142, and to generate, as output, the most probable label 116 for the request. The standard answer 118 assigned to this label 116 may then be provided to user 104 as response 144.

As an example of an unsupervised machine learning algorithm, response generating machine learning algorithm 136b may be configured to automatically sort previous requests 112a through 112n into a specified number of groupings, based on patterns identified by the algorithm in the set of previous requests 112. For example, response generating algorithm 136b may be configured to sort the set of previous requests 112 into a set of N different groupings, where each grouping includes one or more previous requests 112 that share common features with one another. In certain embodiments, when response generating algorithm 136b receives a new request 142, it updates the N different groupings, by sorting the request into one of these groupings, by identifying the grouping with which the request shares the most common features. In some embodiments, when response generating algorithm 136b receives a new request 142, it generates a new set of groupings, by sorting the set of previous requests 112 plus the new request into N different groupings. Each grouping of one or more previous requests 112 is associated with one or more previous responses 114, each of which was provided by an agent 140 and/or automated response tool 102 in response to receiving the corresponding previous requests 112 that are included in the grouping. Accordingly, after sorting new request 142 into a grouping that includes a subset of previous requests 112, response generating algorithm 136b is configured to provide one or more of the corresponding previous responses 114 as output, for use by automated response tool 102 in generating response 144. For example, in certain embodiments, response generating algorithm 136b is configured to use ranking information 120 to rank the previous responses 114 that correspond to the previous requests 112 with which new request 142 has been grouped, and to provide, as output, the highest ranked previous response 114. Response generating algorithm 136b may perform such ranking in any suitable manner. For example, in certain embodiments, response generating algorithm 136b is configured to rank a set of previous responses 114 based on ranking information 120. Response generating machine learning algorithm 136b may be any suitable unsupervised machine learning algorithm. For example, response generating algorithm 136b may be a K-means clustering algorithm, a hierarchical clustering algorithm, a k nearest neighbors clustering algorithm, a principal component analysis clustering algorithm, a singular value decomposition algorithm, and/or any other suitable type of unsupervised machine learning algorithm.

As another example, response generating machine learning algorithm 136c may be a machine comprehension algorithm that is configured to parse the text associated with a request 142, identify content stored within database 110 as responsive to that request, and return this content for use by automated response tool 102 in generating response 144. Response generating algorithm 136c may identify content that is responsive to a request 142, based on the semantic similarity between the text of request 142 and the text of the content. For example, response generating machine learning algorithm 136c may be configured to determine that an internal FAQ 124 and/or template/script stored in database 110 addresses request 142, by comparing the text of the request to the text of the FAQ question and/or the text of the statement describing the purpose of the template/script. Response generating algorithm 136c may be any suitable machine comprehension algorithm.

Modifications, additions, or omissions may be made to the systems described herein without departing from the scope of the invention. For example, system 100 may include any number of users 104, devices 106, external networks 108a, internal networks 108b, databases 110, previous requests 112, previous responses 114, labels 116, standard answers 118, types of ranking information 120, FAQs 124, templates/scripts 126, processors 128, memories 130, voice-text conversion algorithms 132, suitability machine learning algorithms 134, response generating machine learning algorithms 136, agent devices 138, and agents 140. The components may be integrated or separated. Moreover, the operations may be performed by more, fewer, or other components. Additionally, the operations may be performed using any suitable logic comprising software, hardware, and/or other logic.

II. Response Generation

FIGS. 2A and 2B illustrate an example of the operation of automated response tool 102, in response to receiving a voice request 142 from a user 104. In certain embodiments, for efficiency purposes, automated response tool 102 is configured to automatically generate a response 144 to the request 142, when possible. This function of automated response tool 102 is illustrated in FIG. 2A. On the other hand, when automated response tool 102 determines either (1) prior to attempting to automatically generate a response to request 142, that the request is of a type for which the tool is likely unable to generate a suitable response (as determined by one or more metrics), or (2) after attempting to automatically generate a response to request 142, that the tool has been unable to generate a suitable response (as determined by one or more metrics), the tool forwards the request to agent 140, and provides the agent with information that may be useful in responding to the request. These functions of automated response tool 102 are illustrated in FIG. 2B.

a. Screening for Suitable Requests

As illustrated in FIG. 2A, automated response tool 102 receives voice requests 142 that are transmitted to the tool by user devices 106. In certain embodiments, a user 104 may transmit voice request 142 to automated response tool 102 after dialing an information line operated by the organization to which automated response tool 102 belongs. In response to dialing this information line, device 106 may be connected to automated response tool 102. The tool may then prompt user 104 to provide voice request 142. For example, automated response tool 102 may transmit an audio message to device 106 such as "What can I help you with today?", "Why are you calling?", "While you wait for an available agent, please let me know if you have any questions that I might be able to help you with," and/or any other suitable message prompting user 104 to speak a request 142 into device 106.

In response to receiving a voice request 142, automated response tool 102 first applies a voice-to-text algorithm 132 to the voice request to convert it into text request 202. Automated response tool 102 next applies suitability machine learning algorithm 134 to text request 202 to generate a decision 204 of whether to automatically generate a response to the request or to forward the request to agent 140. In certain embodiments, decision 204 may correspond to a probability that automated response tool 102 will be able to generate a suitable response to request 142, where the suitability is assessed based on one or more metrics that were used to categorize the prior requests with which suitability machine learning algorithm 134 was trained. After suitability machine learning algorithm 134 has generated decision 204, automated response tool 102 performs suitability analysis 206 on decision 204, to determine what further action to take. For example, in embodiments in which decision 204 corresponds to a probability that automated response tool 102 will be able to generate a suitable response to request 142, the tool may compare this probability to a given threshold to determine what further action to take. In particular, if the probability is greater than the threshold, tool 102 may decide that request 142 is suitable for automatic response, and subsequently perform one or more of the actions illustrated in FIG. 2A. On the other hand, if the probability is less than the threshold, tool 102 may decide that request 142 is not suitable for automatic response, and subsequently perform one or more of the actions illustrated in FIG. 2B.

b. Automatic Response Generation

As illustrated in FIG. 2A, in response to determining, during suitability analysis 206, that request 142 is of a type that is suitable for automatic response, automated response tool 102 next applies each of one or more response generating machine learning algorithms 136a through 136c to text request 202 to generate potential responses 208a through 208c to the request. For example, automated response tool 102 may apply (1) first response generating algorithm 136a to text request 202, to generate first response 208a, (2) second response generating algorithm 136b to text request 202, to generate second response 208b, and/or (3) third response generating algorithm 136c to text request 202, to generate third response 208c. Responses 208a through 208c may include one or more standard answers 118, one or more previous responses 114, and/or any other suitable information stored within database 110, such as one or more FAQ answers 124, and/or one or more templates/scripts 126.

In certain embodiments, each response generating machine learning algorithm of algorithms 136a through 136c may be configured to generate a single response of responses 208a through 208c. In some embodiments, one or more response generating machine learning algorithms 136a through 136c may be configured to generate more than one response 208a through 208c. For example, in certain embodiments, response generating algorithm 136b is an unsupervised machine learning algorithm that is configured to group text request 202 with one or more previous requests 112, based on the existence of one or more common features shared between text request 202 and those previous requests 112 with which it was grouped. Response generating algorithm 136b may then be configured to return, as a set of potential responses, those previous responses 114 that were provided to address the previous requests 112 with which algorithm 136b grouped text request 202. Automated response tool 102 may be configured to select potential response 208b from among this set of potential responses, in any suitable manner. As an example, in certain embodiments, automated response tool 102 may generate a score for each potential response, based on ranking information 120 associated with each potential response. For example, automated response tool 102 may assign a score to each potential response based on: (1) feedback 146 that was provided by the user 104 who previously received the potential response; (2) feedback 146 that was provided by one or more agents 140 who previously evaluated the potential response; (3) the time that it took automated response tool 102 and/or agent 140 to previously deliver the potential response to its recipient 104; (4) an approval rating of the agent 140 who previously delivered the potential response; (5) any other suitable information that may be used to generate a score for each of the potential responses generated by response generating algorithm 136b, and/or (6) a combination of the preceding. Automated response tool 102 may then select, as potential response 208b, the response of the set of potential responses generated by algorithm 136b that is associated with the highest score.

After using one or more response generating machine learning algorithms 136a through 136c to generate one or more potential responses 208a through 208c, automated response tool 102 next performs response evaluation 210, to determine which, if any, of the potential responses 208a through 208c are suitable for use as response 144. For example, along with generating potential responses 208a through 208c, each machine learning algorithm 136a through 136c may be configured to provide a probability that the potential response 208 returned by the algorithm addresses text request 202. As an example, consider an embodiment in which first response generating algorithm 136a is a supervised machine learning algorithm which has been trained based on a set of example requests and/or previous requests 112 (each of which has been labeled according to the intent behind the request), to identify the most probable intent behind text request 202. Response generating algorithm 136a may provide, as output, (1) a standard answer 118 that has been assigned to the intent identified by the algorithm as the most probable intent for text request 202, and (2) a probability associated with this intent. As a specific example, response generating algorithm 136a may provide, as output, a proposed response 208a that includes the statement "Monday through Friday, from 8 am to 5 pm," along with an indication that the algorithm has determined that there is an 85% chance that this statement is responsive to text request 202 (e.g., that there is an 85% chance that text request 202 is associated with the "business hours" label 116). As another example, consider an embodiment in which second response generating algorithm 136b is an unsupervised machine learning algorithm that is configured to group text request 202 together with a subset of previous requests 112 based on an identification of common patterns and/or features shared by text request 202 and the subset of previous requests 112. Response generating algorithm 136b may provide, as output, (1) one or more previous responses 114 that correspond to the previous requests 112 of the group to which the algorithm has assigned text request 202, and (2) a probability that text request 202 belongs to this group. As a specific example, response generating algorithm 136b may (1) assign previous responses 112a through 112n into four subsets, (2) determine that the probabilities that text request 202 belongs to each of these subsets are 0.22, 0.13, 0.40, and 0.01, respectively, (3) determine, based on these probabilities, that text request 202 most likely belongs to the third subset, and (4) output one or more previous responses 114 that correspond to previous requests 112 assigned to this third subset, as well as an indication that there is a 40% chance that one or more of these previous responses 114 are responsive to request 142. As a further example, consider an embodiment in which response generating machine learning algorithm 136c is a machine comprehension algorithm that is configured to identify content stored in database 110 that is responsive to text request 202, based on the semantic similarity between text request 202 and the content. Response generating algorithm 136c may provide, as output, (1) the content identified as responsive to text request 202, and (2) a probability that this content is responsive to text request 202, where the probability corresponds to the semantic similarity between text request 202 and the content identified as responsive to the request. As a specific example, response generating algorithm 136c may provide, as output, (1) a proposed response 208c that corresponds to the answer of a FAQ 124, where response generating algorithm 136c has determined that text request 202 is semantically similar to the question associated with FAQ 124, as well as (2) a probability that the answer corresponding to FAQ 124 is responsive to text request 202, which is based on a similarity measure calculated between the question associated with FAQ 124 and text request 202. During response evaluation 210, automated response tool 102 may determine which, if any, of the potential responses 208a through 208c are suitable for use as response 144, based on whether or not any of the probabilities associated with potential responses 208a through 208c are greater than a minimum threshold. For example, during response evaluation 210, automated response tool 102 may determine that one or more of potential responses 208a through 208c is suitable for use as response 144 if the probability associated with the potential response 208 is greater than 0.8.

After performing response evaluation 210, automated response tool 102 next performs consistency check 212. The actions performed by automated response tool 102 during consistency check 212 depend on the number of potential responses 208a through 208c that the tool deemed suitable for use as response 144, during response evaluation 210. In particular, if, during response evaluation 210, automated response tool 102 determined that none of potential responses 208a through 208c are appropriate for use as response 144, automated response tool 102 does not perform any further analysis during consistency check 212, and simply forwards text request 202 to agent 140, as described in further detail below, in the discussion of FIG. 2B. If, during response evaluation 210, automated response tool 102 determined that only one of potential responses 208a through 208c is appropriate for use as response 144, during consistency check 212, automated response tool 102 simply identifies this potential response 208 as best response 214. On the other hand, if, during response evaluation 210, automated response tool 102 determined that more than one of potential responses 208a through 208c is suitable for use as response 144, automated response tool 102 determines whether these potential responses are consistent with one another during consistency check 212. Automated response tool 102 may determine that two or more potential responses 208a through 208c are consistent with one another in any suitable manner. For example, consider a situation in which automated response tool 102 has determined that both response 208a and response 208b are suitable for use as response 144. During consistency check 212, automated response tool 102 may determine whether response 208a and response 208b are consistent with one another by: (1) determining whether the text of response 208a is semantically similar to the text of response 208b (e.g., determining whether a similarity metric evaluated between the two responses is greater than a specified threshold); (2) determining whether potential response 208a and potential response 208b include the same or different information (e.g., determining that potential response 208a and potential response 208b are consistent with one another, where they both include a recitation of the organization's business hours); and/or (3) using any other suitable method to determine whether or not potential response 208a and potential response 208b are consistent with one another. If, during consistency check 212, automated response tool 102 determines that two or more of the potential responses 208a through 208c are inconsistent with one another, automated response tool 102 declines to provide an automatic response 144 to request 142, instead forwarding text request 202 to agent device 138, for response by agent 140, as described in further detail below, in the discussion of FIG. 2B.

If automated response tool 102 determines that the potential responses 208a through 208c are consistent with one another, the tool next selects one of these potential responses as best response 214. Automated response tool 102 may select best response 214 in any suitable manner. As an example, in certain embodiments, automated response tool 102 may select the potential response 208 that is associated with the highest probability that the response addresses text request 202. As another example, in certain embodiments, automated response tool 102 may use ranking information 120 to assign a score to each potential response 208, and select the potential response 208 that is associated with the highest calculated score.

After identifying best response 214, automated response tool 102 next applies text-to-voice algorithm 132 to convert the text of best response 214 into audio response 144. The tool then transmits audio response 144 to user device 106. In certain embodiments, after transmitting audio response 144 to user device 106, automated response tool 102 may prompt user 104 to submit an additional request 142, and the process illustrated in FIG. 2A may repeat.

c. Agent-Assisted Response Generation

FIG. 2B illustrates actions that may be performed by automated response tool 102 and/or agent device 138 in response to automated response tool 102 determining that agent 140 should provide response 144 to request 142. Automated response tool 102 may decide that agent 140 should provide response 144 after determining either that: (1) text request 202 corresponds to a type of request for which none of response generating machine learning algorithms 136a through 136c are likely to generate a suitable response; or (2) none of the potential responses 208a through 208c that have been generated by response generating machine learning algorithms 136a through 136c are suitable for use as response 144 (for example, because each potential response 208 is associated with a probability that the potential response addresses request 142 that is lower than a minimum threshold, and/or because two or more of potential responses 208a through 208c are inconsistent with one another).

As illustrated in FIG. 2B, in response to determining that agent 140 should provide response 144 to request 142, automated response tool 102 transmits text request 202 to agent device 138. Automated response tool 102 additionally connects user device 106 to agent device 138, such that user 104 and agent 140 are able to communicate directly with one another through their associated devices. In certain embodiments, automated response tool 102 is configured to transmit text request 202 to agent device 138 in approximately real time, and agent device 138 is configured to display text request 202 as part of transcript 150 of the communications between user 104 and automated response tool 102. In certain embodiments, transcript 150 may display multiple text requests 202. For example, in response to determining that agent should provide response 144 to request 142, automated response tool 102 may determine that no agents 140 are currently available. Accordingly, automated response tool 102 may inform user 104 that he/she will be connected to an agent who will answer the user's request as soon as an agent becomes available, but that in the meantime user 104 is encouraged to submit additional requests 142 to the tool.

In addition to providing transcript 150 to agent device 138, in certain embodiments, automated response tool 102 is configured to provide one or more suggested responses 148 to agent device 138. As an example, in certain embodiments in which automated response tool 102 used suitability machine learning algorithm 134 to determine that agent 140 should response to request 142, the tool may nevertheless apply one or more of response generating machine learning algorithms 136a through 136c to text request 202, to generate suggested responses 216a through 216c, which are provided to agent device 138 as suggestions 148. As another example, in certain embodiments in which automated response tool 102 used suitability machine learning algorithm 134 to determine to automatically generate a response to request 142, but then determined that response generating machine learning algorithms 136a through 136c were unable to generate a suitable response, automated response tool 102 may nevertheless provide one or more of the responses generated by machine learning algorithms 136a through 136c to agent device 138 as suggestions 148.

In certain embodiments, automated response tool 102 provides suggestions 148 to agent device 138 as a ranked list of potential responses 208/216. For example, as illustrated in FIG. 2B, automated response tool 102 may perform response ranking process 218, to organize responses 216 and/or responses 208 into a list of ranked suggestions 148. Response ranking process 218 may include any suitable method for ranking responses 208/216. As an example, in certain embodiments, response ranking process 218 includes using ranking information 120 to generate a score for each potential response 208/216, and then ranking potential responses 208/216 according to their scores. For example, automated response tool 102 may assign a score to each potential response 208/216 based on: (1) feedback 146 that was provided by the user 104 who previously received the potential response; (2) feedback 146 that was provided by one or more agents 140 who previously evaluated the potential response; (3) the time that it took automated response tool 102 and/or agent 140 to previously deliver the potential response to its intended recipient 104; (4) an approval rating of the agent 140 who previously delivered the potential response; (5) any other suitable information that may be used to generate a score for each of the potential responses 208/216, and/or (6) any combination of the preceding. In response to receiving the ranked list of potential responses 148, agent device 138 is configured to present a certain number of the highest ranked suggestions 148 to agent 140.

In certain embodiments, automated response tool 102 may provide updated suggestions 148 to agent device 138, in response to user 104 communicating additional information to agent 140. In particular, automated response tool 102 may also be configured to: (1) monitor the conversation between user 104 and agent 140; (2) convert the conversation to text, while the conversation is occurring; (3) use all or a portion of this text to add to and/or otherwise update text request 202; (4) apply one or more of response generating machine learning algorithms 136a through 136c to this updated text request 202, to generate updated suggestions 216a through 216c; (5) use ranking information 120 to rank these updated suggestions; and (6) send the ranked updated suggestions 148 to agent device 138. This process may repeat any number of times during the conversation between user 104 and agent 140. For example, automated response tool 102 may apply machine learning algorithms 136a through 136c to updated text request 202 at regular intervals until the tool determines that the conversation between user 104 and agent 140 has ended or that user 104 has communicated a new request 142 to agent 140, which is different from the previous request. Automated response tool 102 may then restart this process for that new request.

Agent 140 may use transcript 150 and ranked suggestions 148 in any suitable manner. As an example, in certain embodiments, agent 140 may review transcript 150 prior to beginning a conversation with user 104. This may place agent 140 in a better position to address user 104's request 142, when user 104 is connected to agent 140. As another example, in certain embodiments, agent 140 may decide to use one or more suggested responses 148 to respond to request 142. In this manner, suggestions 148 may aid agent 140 in efficiently responding to request 142.

III. Method for Automated and/or Agent-Assisted Response Generation

FIG. 3 presents a flowchart illustrating an example method 300 (described in conjunction with elements of FIGS. 1, 2A, and 2B) used by automated response tool 102 to receive requests 142, automatically generate responses to the received requests, receive feedback associated with the automatically generated responses, and use the feedback to update one or more of the machine learning algorithms that were used to generate the responses.

In step 302 automated response tool 102 receives voice request 142 from user 104. In step 304 automated response tool 102 uses voice-to-text algorithm 132 to convert voice request 142 into text request 202. In step 306 automated response tool 102 applies suitability machine learning algorithm 134 to decide between automatically generating a response to request 142 or forwarding request 142 to agent device 138. If, in step 306 automated response tool 102 decides to automatically generate a response to request 142, in step 308 automated response tool 102 applies one or more response generating machine learning algorithms 136a through 136c to generate a set of potential responses 208. In step 310 automated response tool 102 evaluates each potential response 208a through 208c to determine whether: (1) the probability that the potential response addresses request 142 (as determined by the machine learning algorithm that generated the response) is greater than a threshold, and (2) it is not inconsistent with any of the other potential responses 208. If, in step 310 automated response tool 102 determines that one or more of potential responses 208 satisfy these requirements, in step 312 automated response tool 102 selects best response 214 from among the potential responses 208 that satisfy the requirements. As described above, in certain embodiments, automated response tool 102 selects best response 214 by (1) assigning each potential response 208 a score, based on ranking information 120 collected for the response, and (2) selecting the potential response 208 that is assigned the highest score.

In certain embodiments, best response 214 may correspond to a transcript/script 126 that relies on further information from user 104, as opposed to a response 144 that is able to address user 104's request 142 without any further input from user 104. Accordingly, in step 314 automated response tool 102 determines whether best response 214 corresponds to a transcript/script 126. If, in step 314 automated response tool 102 determines that best response 214 corresponds to a transcript/script 126, in step 324 the tool begins to walk through the transcript/script, by applying text-to-voice algorithm 132 to a first portion of the transcript/script that includes a first request for user input.

Automated response tool 102 then transmits the resulting audio to user device 106. In step 326 automated response tool 102 receives a voice response to the request for user input previously transmitted, and uses voice-to-text algorithm 132 to convert the voice response into text. In step 328 automated response tool 102 determines whether template/script 126 includes any additional questions for which user input is needed. If, in step 328 automated response tool 102 determines that template/script 126 includes additional questions, in step 330 automated response tool 102 applies text-to-voice algorithm 132 to the next question of template/script 126 and transmits the resulting audio signals to user device 104. Method 300 then returns to step 326. These steps may repeat any number of times until automated response tool 102 determines in step 328 that template/script 126 does not include any additional questions for which user input is needed.

If, in step 328 automated response tool 102 determines that template/script 126 does not include any additional questions for which user input is needed, in step 332 automated response tool 102 uses the input gathered from user 104 to generate a textual response to request 142. As an example of the use of a template/script 126, request 142 may correspond to a request to cancel a recurring transaction, and response generating algorithm 136c may determine that template/script 126a provides steps to be followed to respond to such a request. These steps may include: (1) requesting that user 104 provide information that may be used to verify his/her identity; (2) receiving this information and using it to verify user 104's identity; (3) requesting that user 104 identify the recurring transaction that he/she wishes to cancel; (4) receiving user 104's identification of the recurring transaction to be canceled; (5) canceling the recurring transaction; and (6) generating a textual response that includes a confirmation number and/or any other information associated with the cancellation that is to be provided to user 104 as response 144. After generating the textual response to request 142, method 300 proceeds to step 316.

In step 316 automated response tool 102 applies text-to-voice algorithm 132 to the textual response to request 142 to generate audio response 144. In step 318 automated response tool 102 transmits audio response 144 to device 106. In certain embodiments, after transmitting audio response 144 to device 106, automated response tool 102 may also transmit a request for feedback associated with response 144 to device 106. In step 320 automated response tool 102 determines whether the tool has received feedback 146 from user 104 about response 144. Feedback 146 from user 104 may take any suitable form. As an example, in certain embodiments, feedback 146 corresponds to an answer provided by user 104 in response to automated response tool 102 transmitting a message to device 106 asking user 104 if the response 144 provided by the tool was useful. As another example, in certain embodiments, automated response tool 102 determines that user 104 is providing negative feedback 146 to a response 144, where user 104 subsequently requests to speak to a live agent 140.

If, in step 320 automated response tool 102 determines that feedback associated with a response 144 has been submitted, in step 322 the tool uses the feedback to update and/or retrain one or more of suitability machine learning algorithm 134 and/or response generating machine learning algorithms 136a through 136c. As an example, in certain embodiments in which suitability machine learning algorithm 134 is a reinforcement learning algorithm, automated response tool 102 uses the feedback it receives to generate rewards (for positive feedback) and punishments (for negative feedback) that it uses to update algorithm 134. As another example, in certain embodiments, automated response tool 102 may use the feedback it receives to determine that the number of groupings into which response generating algorithm 136b is configured to sort previous requests 112a through 112n should be adjusted, and accordingly perform such adjustment.

If, in step 306 automated response tool 102 determines that request 142 is not suitable for automatic response, in step 334 the tool transmits the text version 202 of request 142 to agent device 138. Similarly, if, in step 310 automated response tool 102 determines: (1) that none of the potential responses 208a through 208c generated by response generating algorithms 136a through 136c are associated with a probability that the potential response addresses request 142 (as determined by the machine learning algorithm that generated the response) that is greater than a threshold, or (2) that two or more of the potential responses 208a through 208c are inconsistent with one another, in step 334 the tool transmits the text version 202 of request 142 to agent device 138. In certain embodiments, automated response tool 102 additionally provides suitability machine learning algorithm 134 with a punishment, to indicate that the decision made by the algorithm, to automatically generate a response to request 142 rather than connect user 104 with agent 140 was the wrong one, and uses this punishment to update the algorithm. In step 334 automated response tool 102 additionally connects user device 106 to agent device 138. In step 336, automated response tool 102 applies one or more of response generating machine learning algorithms 136a through 136c to text request 202, to generate one or more suggested responses 216 to text request 202.

In step 336 automated response tool 102 identifies suggested responses 208/216 to provide to agent device 138. In certain embodiments, automated response tool 102 generates suggested responses 216 by applying one or more of machine learning algorithms 136a through 136c to text request 202. In some embodiments, automated response tool 102 identifies suggested responses 208 from responses previously generated by one or more of machine learning algorithms 136a through 136c for text request 202. In step 340 automated response tool 102 ranks suggested responses 208/216. For example, in certain embodiments, automated response tool 102 uses ranking information 120 to generate a score for each suggested response 208/216, and ranks suggested responses 208/216 according to these scores. In step 340 automated response tool 102 transmits the ranked set of suggested responses 208/216 to agent device 138, for presentation to agent 140 as suggestions 148. Agent 140 may use suggestions 148 in any suitable manner. For example, agent 140 may generate response 144 that the agent provides to user 104 based on one or more of suggestions 148.

In step 342 automated response tool 102 receives feedback 154 associated with one or more of the suggested responses 208/216 from agent 140. Automated response tool 102 may receive feedback 154 in any suitable manner. As an example, in certain embodiments, agent device 138 is configured to display one or more buttons alongside each suggested response that is displayed as part of suggestions 148. These buttons may be selectable by agent 140 to indicate whether agent 140 approves of the suggestion (e.g., confirms that the suggestion addresses the user's request 142, finds the suggestion straightforward and easy to understand, etc.) and/or disapproves of the suggestion (e.g., believes that the suggestion does not address request 142, finds the suggestion to be overly complicated, etc.). In response to selecting one of these buttons, agent device 138 may be configured to transmit feedback about the associated suggestion 148 to automated response tool 102. As another example, in certain embodiments, automated response tool 102 may be configured to monitor for the response 144 provided by agent 140 to request 142, convert this response into text, and compare the text of the provided response to suggestions 148. Automated response tool 102 may use this comparison to generate feedback 154 for one or more of suggestions 148. For example, automated response tool 102 may calculate a similarity metric between the text of response 144 and the text of each suggestion 148, and use this metric as feedback 154. For instance, in response to identifying a high degree of similarity between the text of response 144 and a first suggestion 152a, tool 102 may assign positive feedback 154 to that suggestion. On the other hand, in response to identifying a low degree of similarity between the text of response 144 and a second suggestion 152b, tool 102 may assign negative feedback 154 to that suggestion. In certain embodiments, automated response tool 102 additionally stores text request 202 and the text of response 144 in database 110 as a previous request 112 and a previous response 114, respectively. In response to receiving feedback 154 in step 342, method 300 proceeds to step 322, where automated response tool 102 uses the feedback to retrain one or more of suitability machine learning algorithm 134 and/or response generating machine learning algorithms 136a through 136c, as described above.

Modifications, additions, or omissions may be made to method 300 depicted in FIG. 3. Method 300 may include more, fewer, or other steps. For example, steps may be performed in parallel or in any suitable order. While discussed as automated response tool 102 and agent device 138 (or components thereof) performing certain steps, any suitable components of system 100, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. An apparatus comprising:
  a memory configured to store a first machine learning algorithm configured, when executed by a hardware processor, to use a set of text associated with a request for information stored within an internal network to select between:
   forwarding the request to a device of an agent; and
   transmitting a reply to the request, the reply automatically generated based on the set of text and a first source of data stored within the internal network; and
  the hardware processor communicatively coupled to the memory, the hardware processor configured to:
   receive feedback for a decision made by the first machine learning algorithm, wherein:
    the decision made by the first machine learning algorithm comprises at least one of:
     a decision to forward the request to the device of the agent; or
     a decision to transmit the automatically generated reply to the request; and
    the feedback indicates at least one of:
     the automatically generated reply comprises the information sought by the request; or the automatically generated reply does not comprise the information sought by the request;
assign a reward value to the feedback, the reward value comprising at least one of:
a first positive reward value, wherein the decision made by the first machine learning algorithm comprises the decision to forward the request to the device of the agent and the feedback indicates that the automatically generated reply does not comprise the information sought by the request;
a second positive reward value, wherein the decision made by the first machine learning algorithm comprises the decision to transmit the automatically generated reply to the request and the feedback indicates that the automatically generated reply comprises the information sought by the request;
a first negative reward value, wherein the decision made by the first machine learning algorithm comprises the decision to forward the request to the device of the agent and the feedback indicates that the automatically generated reply comprises the information sought by the request; or
a second negative reward value, wherein the decision made by the first machine learning algorithm comprises the decision to transmit the automatically generated reply and the feedback indicates that the automatically generated reply does not comprise the information sought by the request; and
use the reward value to update the first machine learning algorithm; wherein:
the decision made by the first machine learning algorithm comprises the decision to forward the request to the device of the agent;
forwarding the request to the device of the agent comprises:
transmitting the set of text to the device of the agent; and
connecting, over an external network, the device of the agent to a device of the user; and
the hardware processor is further configured to:
monitor for a response to the request transmitted from the device of the agent to the device of the user; and
determine a similarity score between text corresponding to the response to the request transmitted from the device of the agent and text corresponding to the automatically generated reply to the request, wherein the feedback submitted by the agent comprises the similarity score.

2. The apparatus of claim 1, wherein:
the request was submitted by a user;
the decision made by the first machine learning algorithm comprises the decision to transmit the automatically generated reply to the request, wherein the automatically generated reply was transmitted to a device of the user; and
the feedback for the decision comprises feedback submitted by the user.

3. The apparatus of claim 2, wherein the feedback submitted by the user comprises at least one of:
an indication that the user was satisfied with the automatically generated reply;
an indication that the user was not satisfied with the automatically generated reply;
a numerical rating of the automatically generated reply;
an indication that the user prefers receiving replies that are generated by agents; or
an indication that the user prefers receiving replies that are automatically generated.

4. The apparatus of claim 1, wherein:
the automatically generated reply to the request was transmitted to the device of the agent; and
the feedback for the decision comprises feedback submitted by the agent.

5. The apparatus of claim 4, wherein the device of the agent is configured to display:
text corresponding to the automatically generated reply to the request; and
one or more buttons associated with the automatically generated reply to the request, the one or more buttons selectable by the agent to submit the feedback submitted by the agent.

6. The apparatus of claim 1, wherein:
the decision made by the first machine learning algorithm comprises the decision to transmit the automatically generated reply to the request;
the hardware processor is further configured to use a second machine learning algorithm to generate, based on the set of text and the first source of data, the automatically generated reply to the request, wherein the automatically generated reply to the request is associated with a probability that the automatically generated reply to the request comprises the information sought by the request; and
receiving the feedback for the decision made by the first machine learning algorithm comprises at least one of:
determining that the probability is greater than a threshold, wherein the feedback indicates that the automatically generated reply comprises the information sought by the request; or
determining that the probability is not greater than the threshold, wherein the feedback indicates that the automatically generated reply does not comprise the information sought by the request.

7. A method comprising:
receiving feedback for a decision made by a first machine learning algorithm, wherein:
the first machine learning algorithm is configured, when executed by a hardware processor, to use a set of text associated with a request for information stored within an internal network to select between:
forwarding the request to a device of an agent; and
transmitting a reply to the request, the reply automatically generated based on the set of text and a first source of data stored within the internal network;
the decision made by the first machine learning algorithm comprises at least one of:
a decision to forward the request to the device of the agent; or
a decision to transmit the automatically generated reply to the request; and
the feedback indicates at least one of:
the automatically generated reply comprises the information sought by the request; or
the automatically generated reply does not comprise the information sought by the request;
assigning a reward value to the feedback, the reward value comprising at least one of:
a first positive reward value, wherein the decision made by the first machine learning algorithm comprises the decision to forward the request to the device of the agent and the feedback indicates that the automatically generated reply does not comprise the information sought by the request;
a second positive reward value, wherein the decision made by the first machine learning algorithm comprises the decision to transmit the automatically generated reply to the request and the feedback indicates that the automatically generated reply comprises the information sought by the request;
a first negative reward value, wherein the decision made by the first machine learning algorithm comprises the decision to forward the request to the device of the agent and the feedback indicates that the automatically generated reply comprises the information sought by the request; or
a second negative reward value, wherein the decision made by the first machine learning algorithm comprises the decision to transmit the automatically generated reply and the feedback indicates that the automatically generated reply does not comprise the information sought by the request; and
using the reward value to update the first machine learning algorithm; wherein:
the decision made by the first machine learning algorithm comprises the decision to forward the request to the device of the agent;
forwarding the request to the device of the agent comprises:
transmitting the set of text to the device of the agent; and
connecting, over an external network, the device of the agent to a device of the user; and
the method further comprises:
monitoring for a response to the request transmitted from the device of the agent to the device of the user; and
determining a similarity score between text corresponding to the response to the request transmitted from the device of the agent and text corresponding to the automatically generated reply to the request, wherein the feedback submitted by the agent comprises the similarity score.

8. The method of claim 7, wherein:
the request was submitted by a user;
the decision made by the first machine learning algorithm comprises the decision to transmit the automatically generated reply to the request, wherein the automatically generated reply was transmitted to a device of the user; and
the feedback for the decision comprises feedback submitted by the user.

9. The method of claim 8, wherein the feedback submitted by the user comprises at least one of:
an indication that the user was satisfied with the automatically generated reply;
an indication that the user was not satisfied with the automatically generated reply;
a numerical rating of the automatically generated reply;
an indication that the user prefers receiving replies that are generated by agents; or
an indication that the user prefers receiving replies that are automatically generated.

10. The method of claim 7, wherein:
the automatically generated reply to the request was transmitted to the device of the agent; and
the feedback for the decision comprises feedback submitted by the agent.

11. The method of claim 10, wherein the device of the agent is configured to display:
text corresponding to the automatically generated reply to the request; and
one or more buttons associated with the automatically generated reply to the request, the one or more buttons selectable by the agent to submit the feedback submitted by the agent.

12. The method of claim 7, wherein:
the decision made by the first machine learning algorithm comprises the decision to transmit the automatically generated reply to the request;
the method further comprises using a second machine learning algorithm to generate, based on the set of text and the first source of data, the automatically generated reply to the request, wherein the automatically generated reply to the request is associated with a probability that the automatically generated reply to the request comprises the information sought by the request; and
receiving the feedback for the decision made by the first machine learning algorithm comprises at least one of:
determining that the probability is greater than a threshold, wherein the feedback indicates that the automatically generated reply comprises the information sought by the request; or
determining that the probability is not greater than the threshold, wherein the feedback indicates that the automatically generated reply does not comprise the information sought by the request.

13. A system comprising:
a device of an agent;
a memory configured to store a first machine learning algorithm configured, when executed by a first hardware processor, to use a set of text associated with a request for information stored within an internal network to select between:
forwarding the request to the device of an agent; and
transmitting a reply to the request, the reply automatically generated based on the set of text and a first source of data stored within the internal network; and
a second hardware processor communicatively coupled to the memory, the second hardware processor configured to:
receive feedback for a decision made by the first machine learning algorithm, wherein:
the decision made by the first machine learning algorithm comprises at least one of:
a decision to forward the request to the device of the agent; or
a decision to transmit the automatically generated reply to the request; and
the feedback indicates at least one of:
the automatically generated reply comprises the information sought by the request; or
the automatically generated reply does not comprise the information sought by the request;
assign a reward value to the feedback, the reward value comprising at least one of:
a first positive reward value, wherein the decision made by the first machine learning algorithm comprises the decision to forward the request to the device of the agent and the feedback indicates that the automatically generated reply does not comprise the information sought by the request;
a second positive reward value, wherein the decision made by the first machine learning algorithm comprises the decision to transmit the automatically generated reply to the request and the feedback indicates that the automatically generated reply comprises the information sought by the request;
a first negative reward value, wherein the decision made by the first machine learning algorithm comprises the decision to forward the request to the device of the agent and the feedback indicates that the automatically generated reply comprises the information sought by the request; or
a second negative reward value, wherein the decision made by the first machine learning algorithm comprises the decision to transmit the automatically generated reply and the feedback indicates that the automatically generated reply does not comprise the information sought by the request; and use the reward value to update the first machine learning algorithm; wherein:
the decision made by the first machine learning algorithm comprises the decision to forward the request to the device of the agent;
forwarding the request to the device of the agent comprises:
transmitting the set of text to the device of the agent; and
connecting, over an external network, the device of the agent to a device of the user; and
the second hardware processor is further configured to:
monitor for a response to the request transmitted from the device of the agent to the device of the user; and
determine a similarity score between text corresponding to the response to the request transmitted from the device of the agent and text corresponding to the automatically generated reply to the request, wherein the feedback submitted by the agent comprises the similarity score.

14. The system of claim 13, wherein:
the request was submitted by a user;
the decision made by the first machine learning algorithm comprises the decision to transmit the automatically generated reply to the request, wherein the automatically generated reply was transmitted to a device of the user; and
the feedback for the decision comprises feedback submitted by the user.

15. The system of claim 14, wherein the feedback submitted by the user comprises at least one of:
an indication that the user was satisfied with the automatically generated reply;
an indication that the user was not satisfied with the automatically generated reply;
a numerical rating of the automatically generated reply;
an indication that the user prefers receiving replies that are generated by agents; or
an indication that the user prefers receiving replies that are automatically generated.

16. The system of claim 13, wherein:
the automatically generated reply to the request was transmitted to the device of the agent; and
the feedback for the decision comprises feedback submitted by the agent.

17. The system of claim 16, wherein the device of the agent is configured to display:
text corresponding to the automatically generated reply to the request; and
one or more buttons associated with the automatically generated reply to the request, the one or more buttons selectable by the agent to submit the feedback submitted by the agent.

* * * * *